United States Patent
Denpo

(10) Patent No.: US 8,295,460 B2
(45) Date of Patent: Oct. 23, 2012

(54) COMMUNICATION APPARATUS

(75) Inventor: Toshiaki Denpo, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1608 days.

(21) Appl. No.: 11/679,315

(22) Filed: Feb. 27, 2007

(65) Prior Publication Data
US 2007/0201649 A1 Aug. 30, 2007

(30) Foreign Application Priority Data
Feb. 27, 2006 (JP) ................................. 2006-051212

(51) Int. Cl.
H04M 15/06 (2006.01)

(52) U.S. Cl. .......... 379/142.01; 379/142.04; 379/142.06

(58) Field of Classification Search .............. 379/88.21, 379/100.01, 142.01, 142.04, 142.06, 88.19
See application file for complete search history.

(56) References Cited

U.S. PATENT DOCUMENTS

| 7,035,388 B2 * | 4/2006 | Kurosaki | 379/142.06 |
| 7,142,846 B1 * | 11/2006 | Henderson | 455/417 |
| 2007/0201649 A1 | 8/2007 | Denpo | |

FOREIGN PATENT DOCUMENTS

| JP | H02-015756 A | 1/1990 |
| JP | H04-007963 A | 1/1992 |
| JP | H04-115657 A | 4/1992 |
| JP | H07-325863 A | 12/1995 |
| JP | H8 242353 | 9/1996 |
| JP | H08-265546 A | 10/1996 |
| JP | H10-028215 A | 1/1998 |
| JP | H10 93793 | 4/1998 |
| JP | H10-164344 A | 6/1998 |
| JP | 2000-165569 A | 6/2000 |
| JP | 2001 326771 | 11/2001 |
| JP | 2002-247236 A | 8/2002 |
| JP | 2002-290690 A | 10/2002 |
| JP | 2003 333167 | 11/2003 |
| JP | 2006-013855 A | 1/2006 |
| JP | 2007-235249 A | 9/2007 |

OTHER PUBLICATIONS

Japanese Patent Office, Office Action issued in corresponding Japanese Application No. 2006-051212, dated Feb. 2, 2009.
Japan Patent Office; Notification of Reason for Refusal in Japanese Patent Application No. 2009-090850 (counterpart to the above-captioned U.S. patent application) mailed Sep. 29, 2009.
Japan Patent Office; Notification of Reason for Refusal in Japanese Patent Application No. 2006-051212 (counterpart to the above-captioned U.S. patent application) mailed Apr. 21, 2009.

* cited by examiner

Primary Examiner — Yuwen Pan
Assistant Examiner — Yosef K Laekemariam
(74) Attorney, Agent, or Firm — Baker Botts L.L.P.

(57) ABSTRACT

A communication apparatus includes an obtaining unit, an image data receiving unit, an extracting unit and a first display control unit. The obtaining unit is configured to obtain a caller identification information through a caller identification via a communication line when an incoming call is received from a caller. The image data receiving unit is configured to receive an image data transmitted from the caller via the communication line. The extracting unit is configured to extract caller information from the image data to specify the caller. The first display control unit is configured to display the caller information on a display screen when the obtaining unit does not obtain the caller identification information at the incoming call.

26 Claims, 18 Drawing Sheets

| MANAGEMENT NUMBER | TELEPHONE NUMBER | NAME |
|---|---|---|
| 1 | 052234XXXX | TAKAHASHI |
| 2 | 052235XXXX | YAMAZAKI |
| 3 | 052236XXXX | KOBAYAKAWA |
| 4 | 052237XXXX | YAMAMOTO |
| 5 | 052238XXXX | KINUGASA |
| 6 | 052239XXXX | NAGASHIMA |
| 7 | 052240XXXX | SHODA |
| 8 | 052241XXXX | TATSUKAWA |
| 9 | 052242XXXX | ONO |
| 10 | 052243XXXX | KIYOKAWA |
| 11 | 052244XXXX | TSUDA |
| 12 | | |
| 13 | | |
| 14 | | |

FIG. 5

| MANAGEMENT NUMBER | CALLER NUMBER | RECEPTION TIME | ADDRESS OF CALLER INFORMATION | ADDRESS OF FACSIMILE DATA |
|---|---|---|---|---|
| 1 | 052234XXXX | 0512201512 | null | 0x010001 |
| 2 | 052235XXXX | 0512201408 | null | 0x010002 |
| 3 | 052236XXXX | 0512191145 | 0x000002 | 0x010003 |
| 4 | null | 0512190801 | 0x000003 | 0x010004 |
| 5 | 052238XXXX | 0512171236 | null | 0x010005 |
| 6 | null | 0512151457 | 0x000005 | 0x010006 |
| 7 | null | 0512151453 | 0x000006 | 0x010007 |
| 8 | 052241XXXX | 0512141754 | null | 0x010008 |
| 9 | 052242XXXX | 0512141012 | 0x000008 | 0x010009 |
| 10 | 052243XXXX | 0512131635 | 0x000009 | null |
| 11 | 052244XXXX | 0512131355 | null | null |
| 12 | | | | |
| 13 | | | | |
| 14 | | | | |
| 15 | | | | |

72

COMMUNICATION APPARATUS

CROSS-REFERENCE TO RELATED APPLICATIONS

This application is based upon and claims the benefit of priority from Japanese Patent Application No. 2006-051212, filed on Feb. 27, 2006, the entire contents of which are incorporated herein by reference.

BACKGROUND

1. Field

The present invention relates to a communication apparatus capable of obtaining caller identification information from caller identification service (Caller ID) via a communication line.

2. Description of the Related Art

Recently, there is a communication apparatus, such as a facsimile (FAX) machine, having a caller ID display function capable of displaying the caller identification information such as a telephone number of the calling party. The caller identification information is obtained through the Caller ID from a telephone station switcher via a telephone line, when the communication apparatus receives an incoming call from the caller. See JP-A-2001-326771, for example.

However, if the caller disables the Caller ID, the Communication apparatus having the caller ID display function cannot display the caller ID information, and a user cannot know who the caller is.

In this kind of the communication apparatus, there is a communication apparatus includes a memory storing a telephone directory in which correspondence information, such as a name, associated with caller ID information are registered, and displays the correspondence information read from the memory corresponding to the obtained caller ID information through the caller ID when the incoming call is received. However, if the communication apparatus receives the incoming call with the caller ID information that is not registered in the telephone directory, the communication apparatus can not display the correspondence information, and only displays the caller ID information. Therefore, it is difficult for the user to know who the caller is.

SUMMARY

According to a first aspect of the invention, there is provided a communication apparatus including; an obtaining unit configured to obtain a caller identification information through a caller identification via a communication line when an incoming call is received from a caller; an image data receiving unit configured to receive an image data transmitted from the caller via the communication line; an extracting unit configured to extract caller information from the image data to specify the caller; and a first display control unit configured to display the caller information on a display screen when the obtaining unit does not obtain the caller identification information at the incoming call.

According to a second aspect of the invention, there is provided a communication apparatus including: an obtaining unit configured to obtain a caller identification information through a caller identification via a communication line when an incoming call is received from a caller; an image data receiving unit configured to receive an image data transmitted from the caller via the communication line; an extracting unit configured to extract caller information from the image data to specify the caller; a first storage unit that stores the caller information and the image data that is correlated to the caller information; an input unit that accepts an input signal to refer to a storage content of the first storage unit; and a first output unit configured to output the caller information stored in the first storage unit in response to the input from the input unit, if the caller identification information is not obtained by the obtaining unit.

BRIEF DESCRIPTION OF THE DRAWINGS

FIG. 5 shows a memory map of a preview list;

DETAILED DESCRIPTION

First Embodiment

Figure 1:
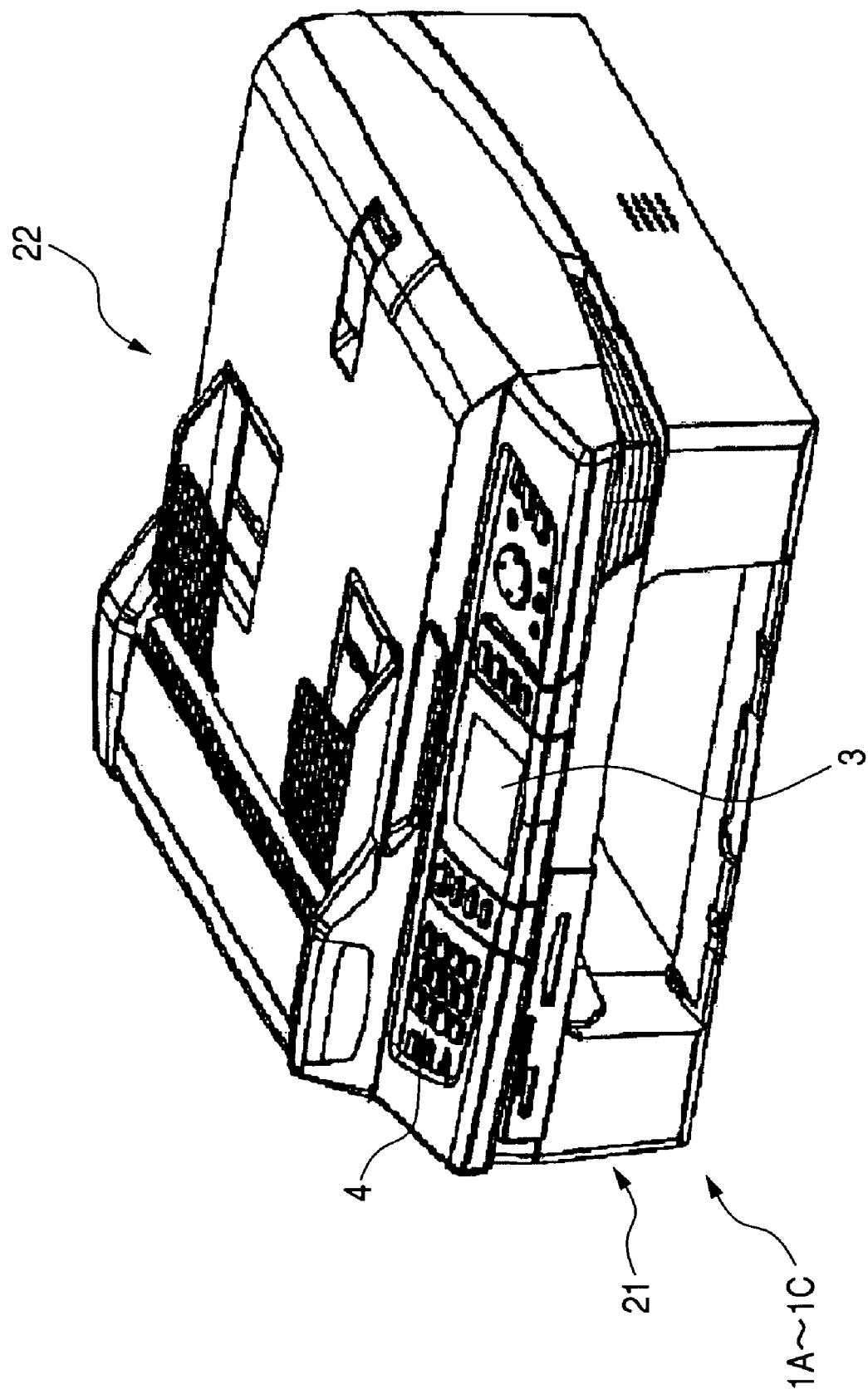
FIG. 1 is a perspective view illustrating an outer configuration of a multi function device of the embodiments.

A first embodiment of the present invention will be described. FIG. 1 is an appearance perspective view of a multi function device 1A as an example of a communication apparatus of the first embodiment. The multi function device 1A includes a lower main unit and an upper main unit that is attached to the lower main unit so as to be freely opened and closed. The lower main unit serves as a printer unit 21, and the upper main unit serves as a scanner unit 22. Since the printer unit 21 and the scanner unit 22 do not have any direct relationship to the present invention, their explanations are omitted in this embodiment.

The multi function device 1A includes an LCD (Liquid Crystal Display) 3 and operation keys 4 both provided on an operation panel located on the front side of the upper main unit.

Figure 2:
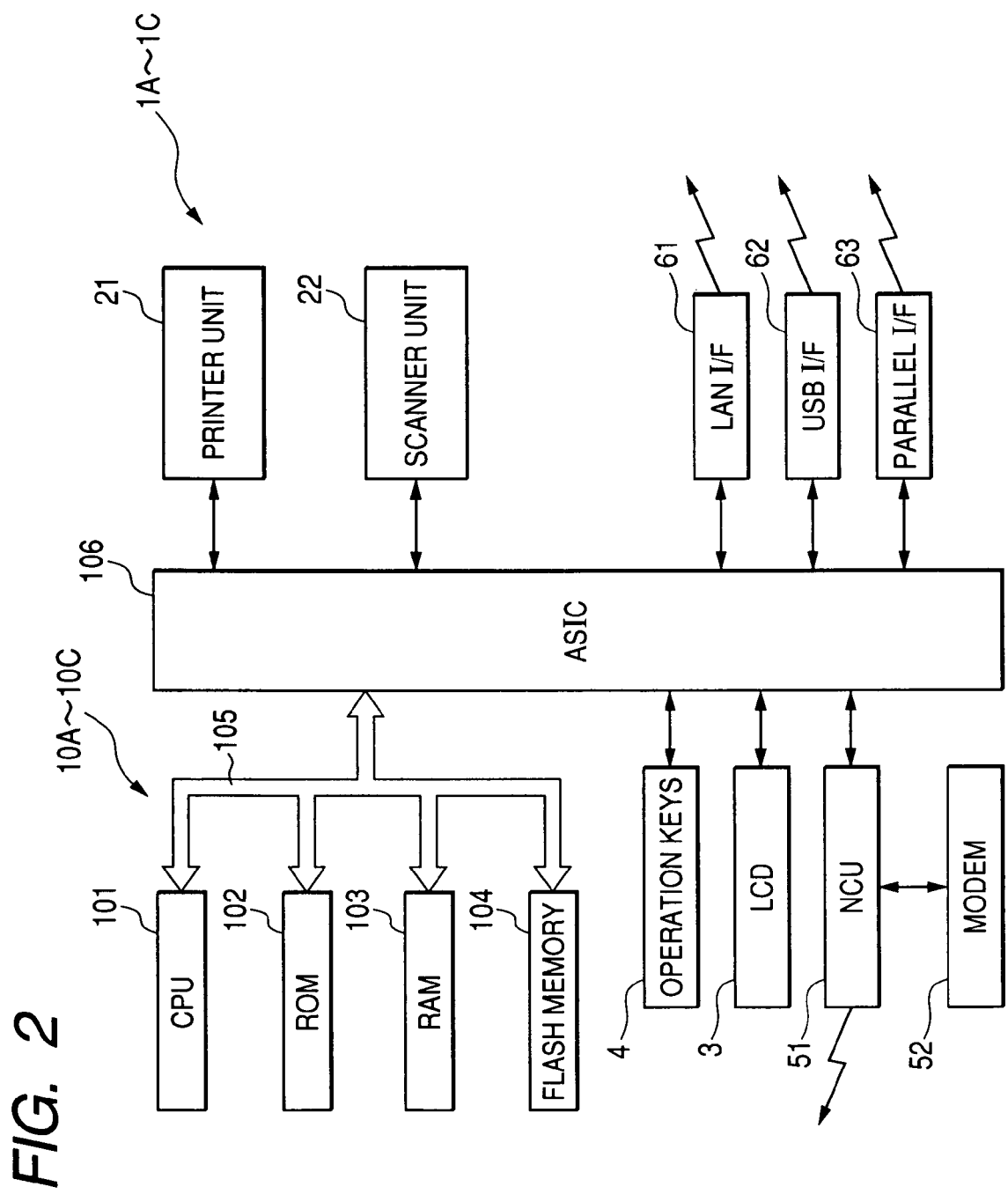
FIG. 2 is a block diagram illustrating an electric configuration of the multi function device.

FIG. 2 is a block diagram showing the electric configuration of the multi function device 1A. The multi function device 1A includes an ASIC (Application Specific Integrated Circuit) 106 connected to the printer unit 21, the scanner unit 22, the LCD 3, the operation keys 4, an NCU (Network Control Unit) 51, a MODEM (MOdulator DEModulator) 52, various interfaces 61 to 63, a controller 10A.

The controller 10A is configured by a microprocessor and includes a CPU 101, a ROM 102, a RAM 103 and a flash memory 104, which are connected via a bus 105 to the ASIC 106. The ROM 102 stores a program to be executed by the CPU 101 and data necessary for it. The RAM 103 functions as a work region when the CPU 101 executes the program.

This controller 10A functions as an extracting unit, a first display control unit, a second display control unit and a display limiting unit.

The LCD 3 includes a display screen for displaying various kinds of information thereon. The operation keys 4 accept an input from a user for operating the multi function device 1A. The operation keys 4 function as an input unit. Also, the LCD 3 is controlled by the controller 10A that functions as the first display control unit and the second display control unit, to perform various displays on the display screen.

The NCU 51 and the MODEM 52 are connected to a communication line so that the communication apparatus performs a facsimile (FAX) function and obtains caller identification information (hereinafter referred to as "caller ID information") through the Caller ID. The NCU 51 and MODEM 52 function as an obtaining unit and an image data receiving unit.

Figures 3, 4:
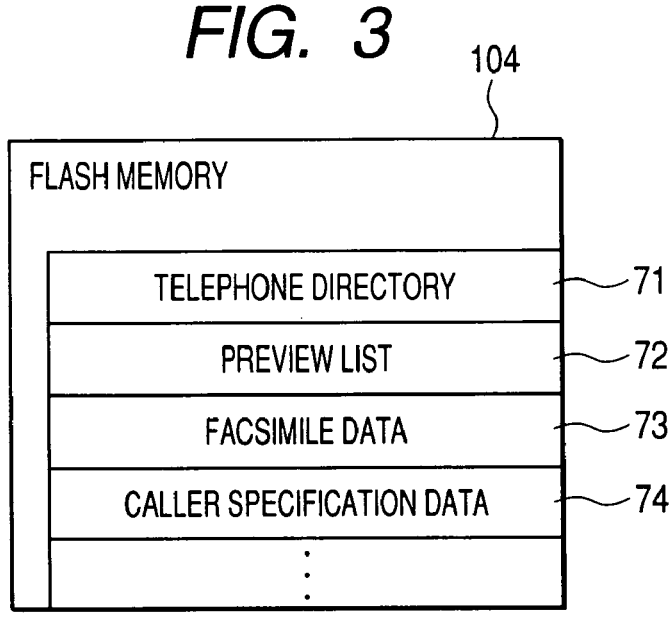
FIG. 3 is a view explaining content stored in a flash memory.
FIG. 4 shows a memory map of a telephone directory list.

As shown in FIG. 3, the flash memory 104 includes a data regions 71 that stores a telephone directory, a data region 72 that stores a preview list, a data region 73 that stores a received facsimile data (image data) and a data region 74 that stores the extracted caller information are formed. This flash memory 104 functions as a storage unit, a first storage unit and a second storage unit.

The data region 71 stores the telephone directory in which caller ID information and correspondence information for several callers is entered. As shown in FIG. 4 illustrating a memory map of the telephone directory, telephone numbers of arbitrary callers as an example of the registered caller ID information are respectively correlated with names of the caller as an example of the correspondence information. This data region 71 is referred when a telephone number of a calling party (hereinafter referred to as "caller number") is obtained in accordance with the Caller ID. Here, the caller number is explained an example of the caller ID information in the embodiments.

As shown in FIG. 5 illustrating a memory map of the preview list, the data region 72 stores the preview list containing a caller number, a received time, an address of the caller information and an address of the facsimile data which are correlated each other for each received FAX. The address of the caller information is a location address of the caller's name stored in the data region 71 and the location address of the caller information stored in the data region 74. Also, the address of the facsimile data is the location address of the received facsimile data (image data) stored in the data region 73.

A communication procedure for FAX is explained. The FAX communication is executed between a terminal (communication apparatus) of a calling party (hereinafter referred to as "calling terminal") and a terminal (communication apparatus) of a called party (hereinafter referred to as "called terminal") in accordance with a FAX communication rule of ITU-T (International Telecommunications Union Technical standardization sector). This FAX communication is advanced in a procedure of phases A, B, and C in this order.

The phase A includes a procedure in a call setting and a line establishment. At the phase A, the calling terminal transmits CNG (Calling Tone) to the called terminal. In response to the CNG, the called terminal transmits CED (Called Station Identification) to the calling terminal. Accordingly, the connection between the calling terminal and the called terminal is established.

The phase B includes a procedure for checking a states of the other party and the telephone line, and executing the preparation for the transmission of the facsimile data (image data) in accordance with the status. At the phase B, the called terminal transmits DIS (Digital Identification Signal), NSF (Non-standard Facilities), and CSI (Called Subscriber Identifications) to the calling terminal.

The DIS includes the function information of the called terminal. This function information is provided with, for example, information regarding a communication performance (a data signal speed and the like), information regarding a print performance (a resolution, a presence or absence of a color print function and the like), information regarding a print size that can be output (a maximum paper width and a maximum length of paper), and the like.

On the contrary, the calling terminal transmits DCS (Digital Command Signal), TSI (Transmitting Subscriber Identifications), and NSS (Non-Standard facilities Set-up) to the called terminal. The DCS is used to determine the transmission condition based on information regarding a document read by the calling terminal and the DIS received from the called terminal, and is transmitted as a response signal to the DIS.

Subsequently, the calling terminal transmits TCF (Training Check) to the called terminal. The TCF is used to check the state of a modem of the other party.

On the contrary, the called terminal transmits CFR (Confirmation to Receive) to the calling terminal. The CFR is transmitted when the modem and the like are adjusted in accordance with the TCF, the adjustment is completed and the preparation for the reception is finished.

The phase C includes a procedure for performing the transmission of the facsimile data. At the phase C, the calling terminal transmits facsimile data to the called terminal.

At the subsequent phases, the transmission of EOP (End of Procedures) from the calling terminal to the called terminal and the like are executed, and the FAX communication is finished. This EOP indicates the completion of the transmission of the facsimile data.

Figure 6:
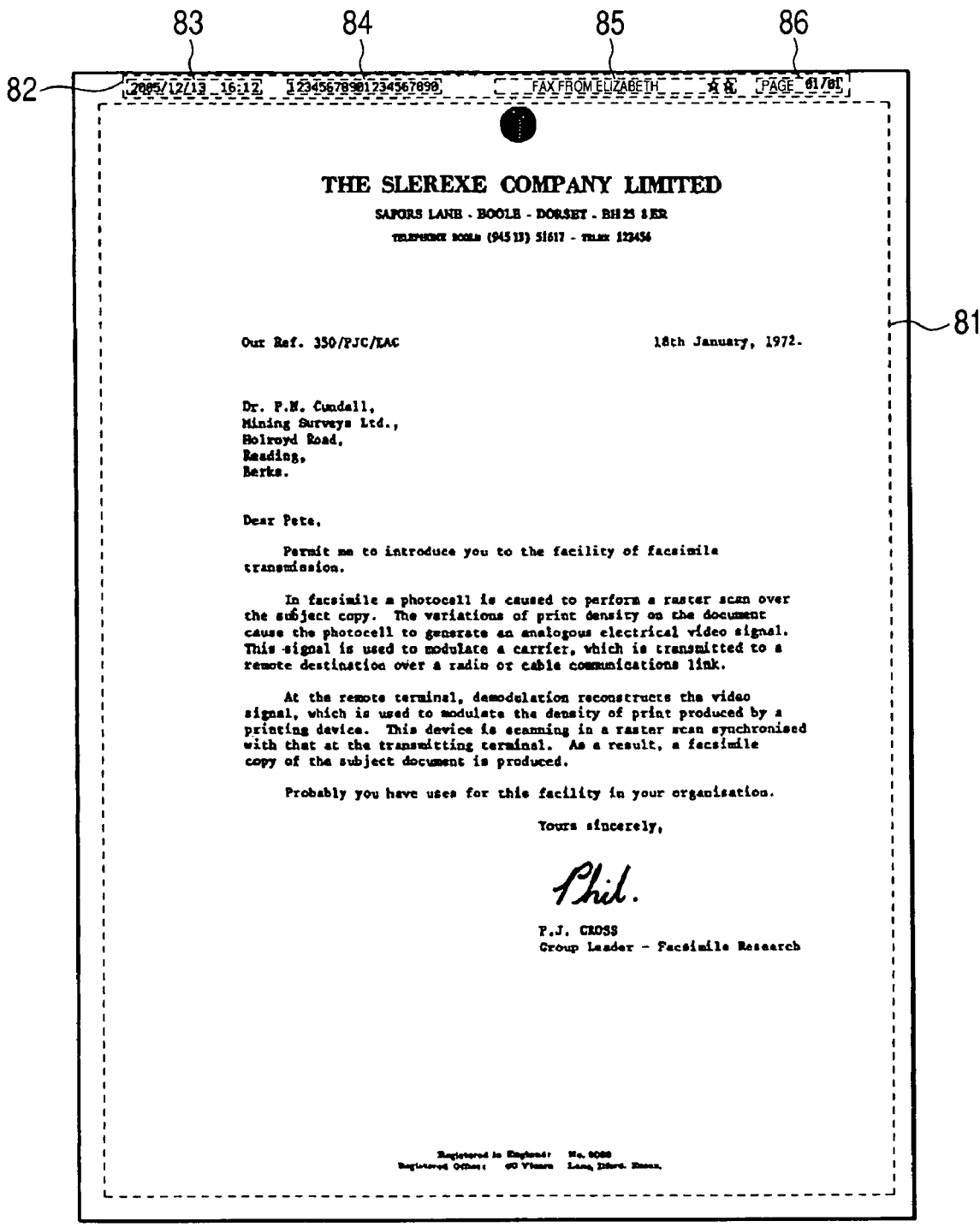
FIG. 6 shows an example of a facsimile data (image data)

FIG. 6 shows an example of the facsimile data (image data) that is received from the calling terminal and formed on a medium such as paper or the like. According to this example, a body part 81 is formed on the substantial whole of a page. Also, a header part 82 is formed in a head region of the page, and this header part 82 includes: a part 83 indicating the date and time at a time of a reception; a part 84 indicating the caller number; a part 85 indicating station ID information of the caller; and a part 86 indicating the page number.

The station ID information is the information of the string registered in a terminal, and usually registers the string indicating the name of a user and the like of the terminal. This station ID information corresponds to the caller information. The station ID is included in a TSI (Transmitting Subscriber Identifications) command transmitted at the phase B of the FAX communication.

Next, the operation of the multi function device 1A will be described.

The controller 10A of the multi function device 1A mainly executes "(1) Display Operation During Reception" and "(2) Display After Reception (Preview Display)." The Display During Reception is an operation to display the information related to the caller during the FAX reception. The Display After Reception is an operation to display the stored image data of the FAX having been received, in response to the user input. Hereafter, each of them is explained.

(1) Display Operation During Reception

Figure 7:
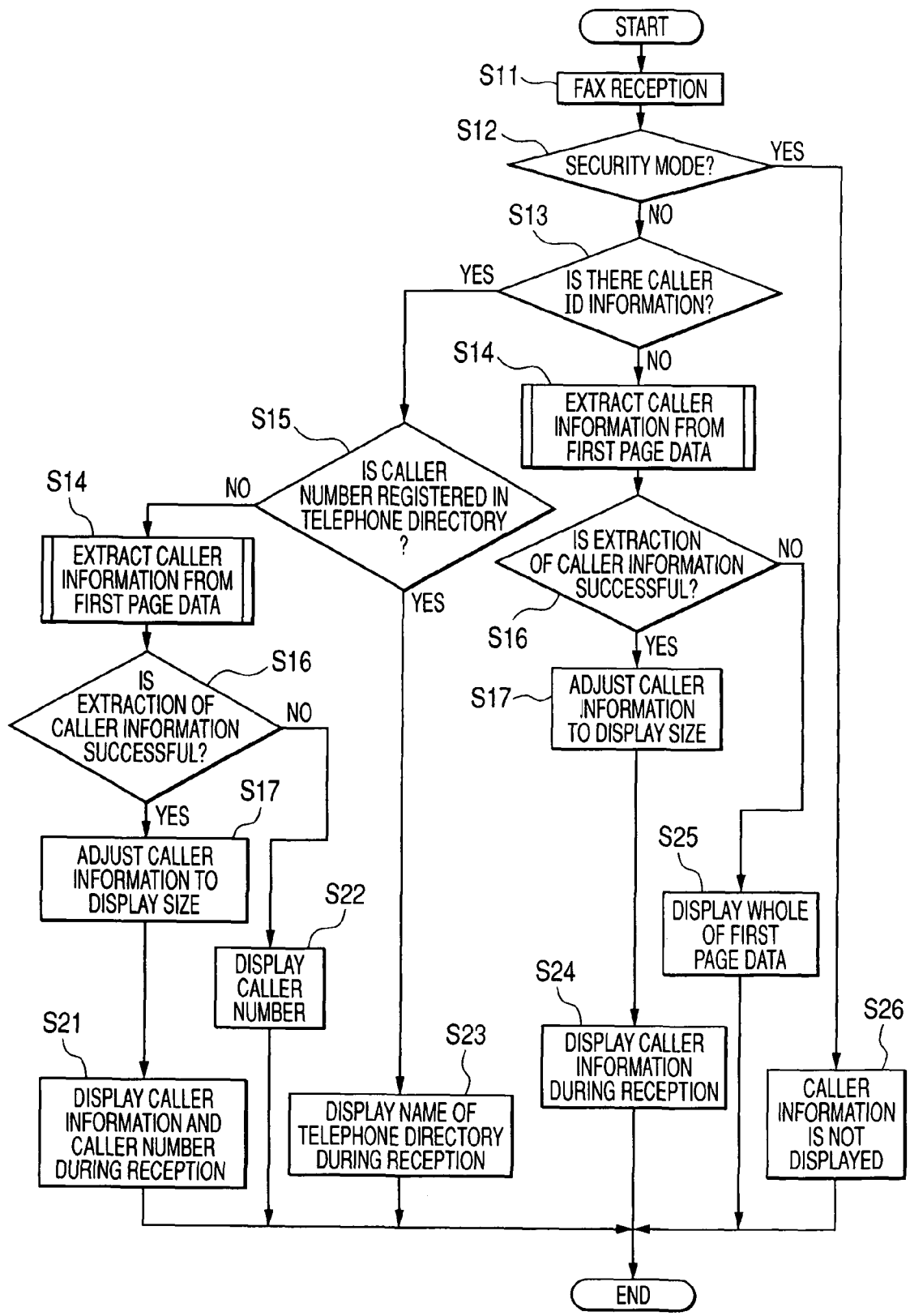
FIG. 7 is a flowchart showing a display process during a reception operation of a first example.

FIG. 7 is a flowchart illustrating a first process example in the Display Operation During Reception executed by the controller 10A in the multi function device 1A.

The controller 10A, when the FAX reception is started (S11), judges whether the state of the multi function device 1A is set to a security mode (S12). The security mode is, for example, the mode to prevent the multi function device 1A from being used by a third party.

If it is set to the security mode (S12; YES), the controller 10A limits the displaying of the caller's name and number and the caller information, which will be described later, in order to protect the information regarding the caller from being viewed by a third party (S26: the function of the display limiting unit).

On the other hand, if the security mode is not set (S12; NO), the controller 10A judges whether the caller number could be obtained through the Caller ID (S13). The obtainment of the caller number through the Caller ID as mentioned above is performed between a telephone station switcher and the multi function device 1A, prior to the start of the FAX communication.

If the caller number could be obtained through the Caller ID (S13: YES), the controller 10A retrieves whether the obtained caller number is registered in the telephone directory (the data region 71; see FIG. 4) (S15).

If the obtained caller number is not registered in the telephone directory (the data region 71) (S15: NO), the controller 10A performs a process to extract the caller information from a page data on a first page of the received image data (S14; function of the extracting unit).

Figure 9:
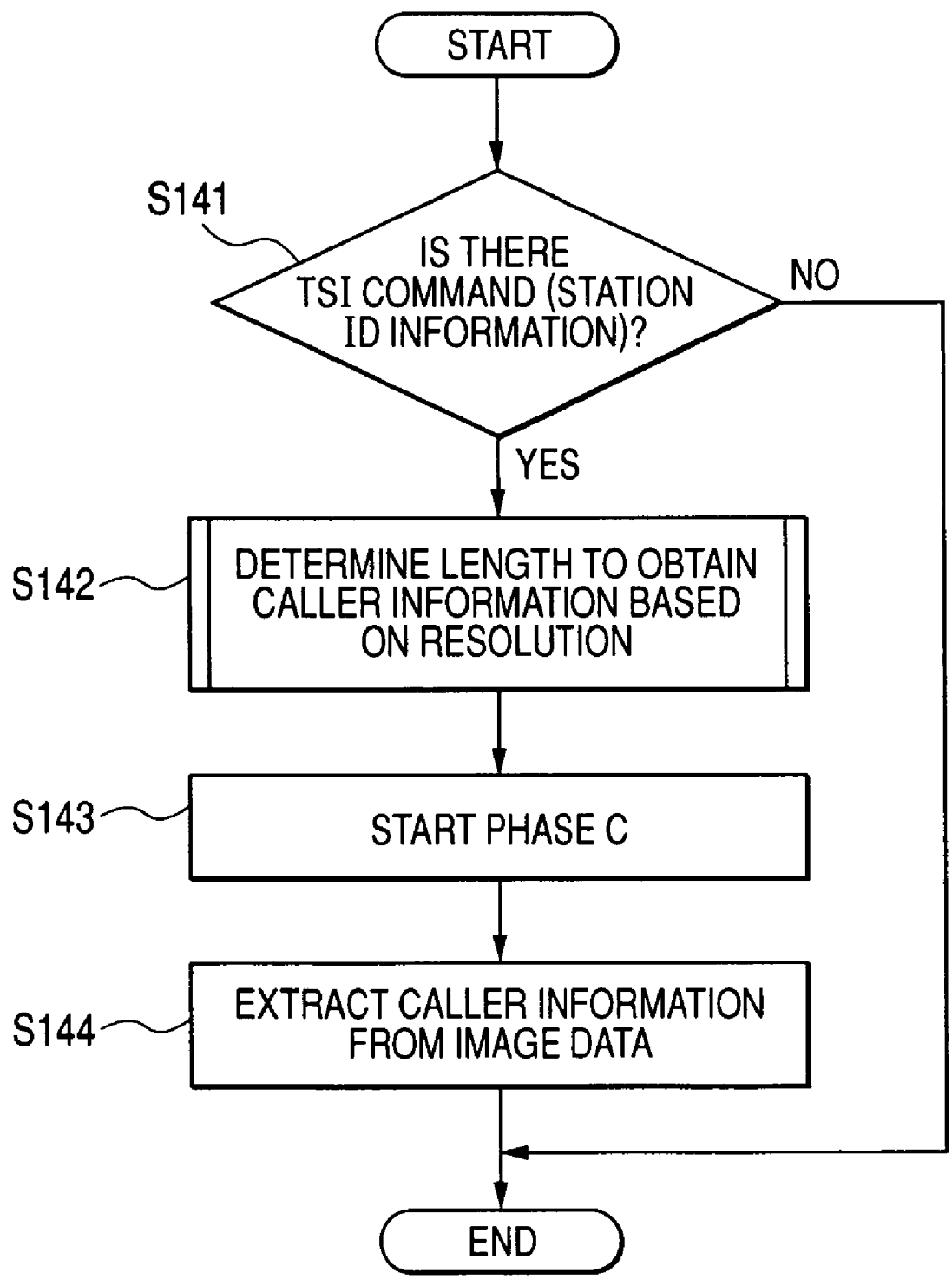
FIG. 9 is a flowchart showing a process for obtaining the caller information according to a first embodiment.

FIG. 9 shows a flowchart showing the process content of the process (S14) to extract the caller information. At first, the controller 10A judges whether the station ID is included in a TSI (Transmitting Subscriber Identifications) command received at the phase B of the FAX communication (S141).

If the station ID is not included (S141: NO), the information of the station ID is not displayed in the facsimile data (image data). Thus, the process is ended without executing S142 to S143 for extracting the caller information.

On the other hand, if the station ID is included (S141: YES), the controller 10A determines a region from which the caller information is extracted, based on the resolution of the received image data (S142).

Specifically, the region for extracting the caller information is defined by: determining whether a non-blank portion exists within a predetermined length (examination length) in a read direction from the head of the page data on the first page; and if the non-blank portion exists, determining the region of a predetermined length (a caller information length) from the position of the non-blank portion in the read direction as the region for extraction. Those lengths are determined based on the resolution. Here, the read direction implies the lamination direction of lines, if the image data is formed at a line unit.

Figure 11:
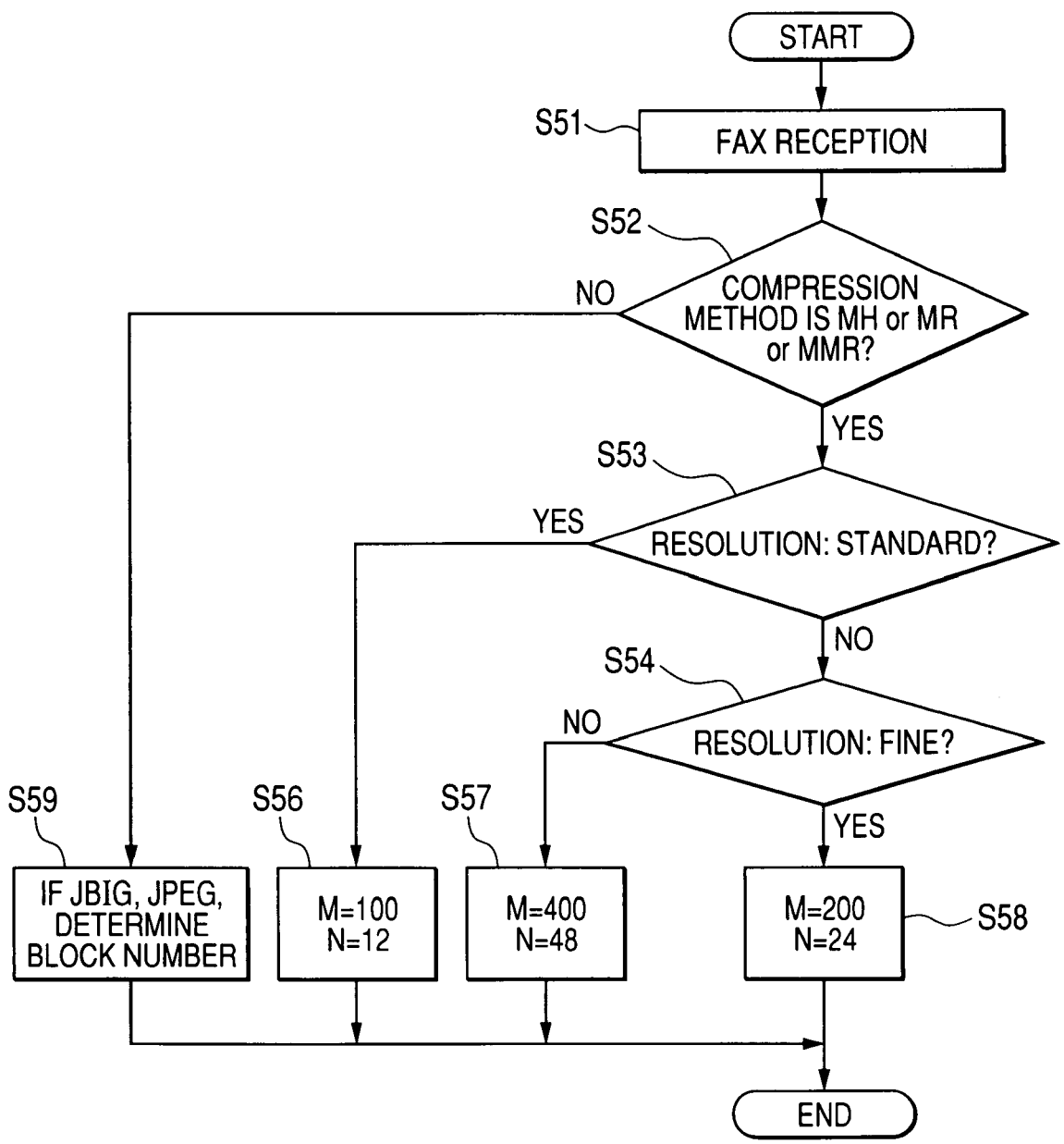
FIG. 11 is a flowchart showing a process for determining a region to obtain the caller information according to the first embodiment.

That is, as shown in the flowchart of FIG. 11, if a compression method of the image data is any of an MH (Modified Huffman) method, an MR (Modified READ (Relative Element Address Designate)) method and an MMR (Modified Modified READ)) method (S51: YES), since the image data is described at the line unit, an examination line number M to determine the examination length and a caller information line number N to determine the caller information length are determined (S56 to S58) based on the resolution (e.g., Standard, Fine, and Super Fine) (S53, S54).

If the compression method of the image data is any of a JPEG (Joint Photographic Experts Group) method and a JBIG (Joint Bi-level Image Experts Group) (S52; NO), the image data is described in a block unit. Therefore, similarly to the foregoing paragraph, a block row number to determine the examination length and a block row number to determine the caller information length are determined.

After the determination of the region from which the caller information is extracted in S142, the controller 10A starts the phase C of the FAX communication (S143) and sequentially receives the image data from the head and then extracts (cut) the caller information as the image data from the defined region (S144).

Figure 10:
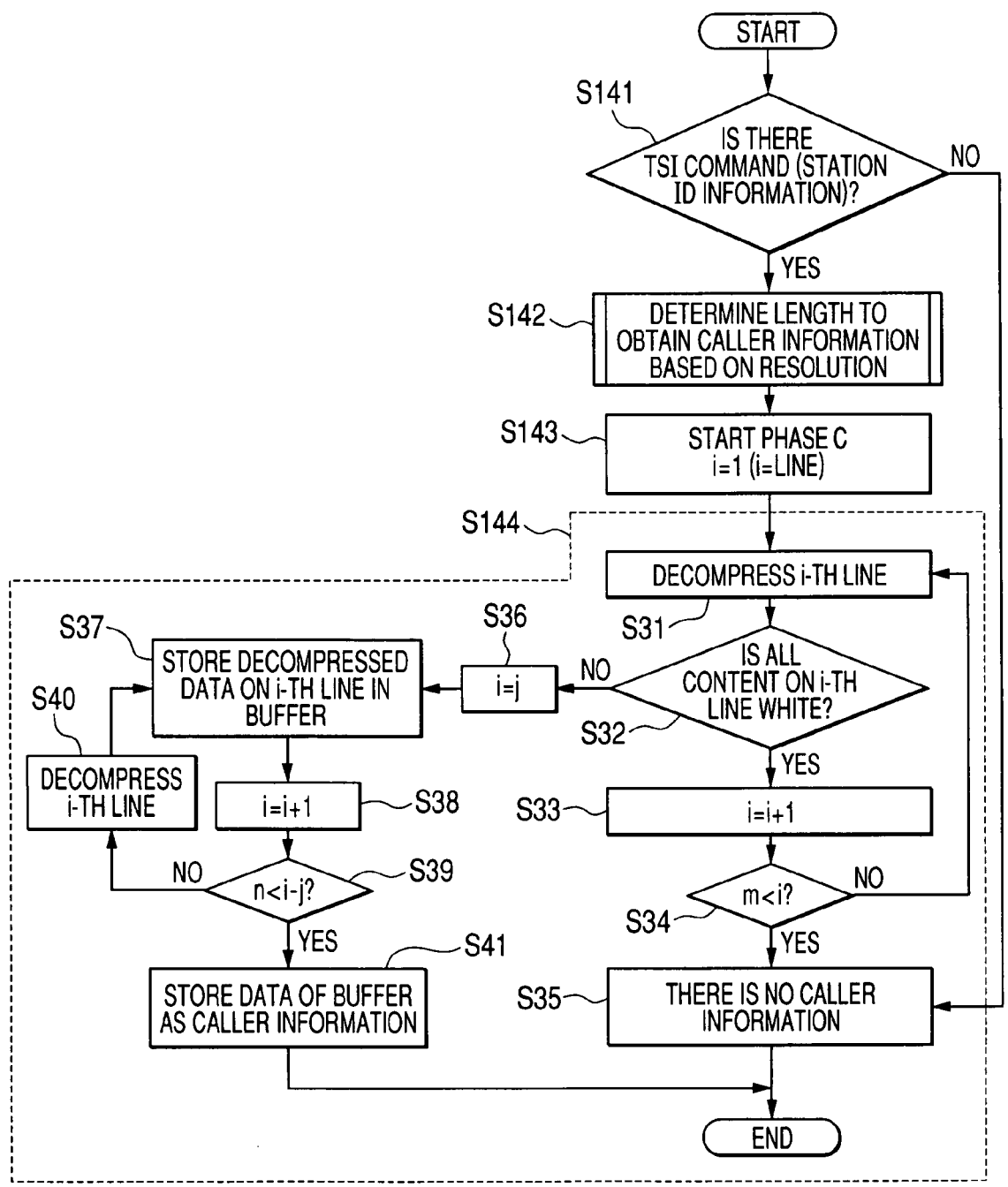
FIG. 10 is a flowchart showing details of a flowchart of FIG. 9 according to the first embodiment.

When the S144 is explained in the case that the image data is described at the line unit, as shown in the flowchart of FIG. 10, the controller 10A sequentially decompresses the lines and examines whether all of the dots constituting the lines are white (namely, whether there is a black dot representing a character and the like), until the examination line number M (S31 to S34; the function of a judging unit).

If a line where all are not the white dots exists (namely, a line including black dots representing a character and the like exists) until the examination line number M (S32; NO), with the line as the head, the line of the caller information line number N is stored in a buffer, and picture data of the caller information is consequently cut from the image data (S36 to S41; the function of a cutting unit). It is noted that the buffer is formed in the RAM 103.

As mentioned above, the picture data of the caller information is extracted from the head region during reception of the page data on the first page. That is, when the phase C in the FAX communication is started, the image data are sequentially received from the head, and the extraction of the picture data of the caller information is executed in parallel thereto.

Figure 12A:
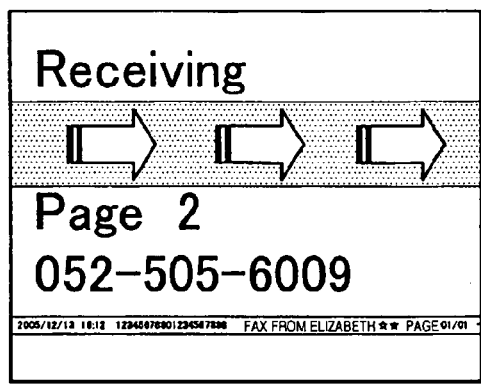
FIGS. 12A to 12E show examples of the information displayed on a display screen during reception according to the first embodiment.

Here, the explanation is return back to the flowchart of FIG. 7. If the picture data of the caller information is extracted in S14 (S16; YES), the controller 10A adjusts the picture data of the call information to the size capable of being displayed on the display screen of the LCD 3 (S17). Then, the controller 10A displays the caller information together with the caller number obtained through the Caller ID (S21). FIG. 12A shows a displaying example of the LCD 3 in S21. A display 31 of the caller number and a display 34A of the picture data of the extracted caller information is displayed on the display screen of the LCD 13, together with a display 39 indicating during FAX reception.

In S14, since the picture data of the caller information is extracted from the head region during reception of the page data on the first page, in S21, the display 34A can be displayed immediately after the extraction of the caller information. That is, since the displaying of the display 34A can be executed prior to the completion of the reception of the page data on the first page, the caller can be noticed to the user from a relatively early stage during FAX reception. This is similar even in the displaying of S24 and the like which will be described later.

Figure 12B:
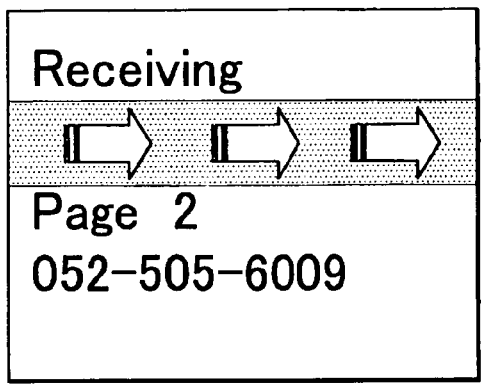

On the other hand, if the picture data of the caller information could not be extracted in S14 (S16: NO), the controller 10A displays the caller number obtained through the Caller ID (S22). FIG. 12B shows the displaying example of the LCD 3 in S22. A display 31 of the caller number is displayed on the display screen of the LCD 3, together with a display 39 indicating during FAX reception.

Figure 12C:
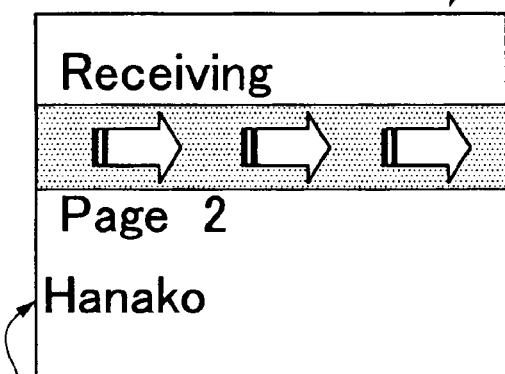

In S15, if the obtained caller number is registered in the telephone directory (data region 71) (S15: YES), the controller 10A reads a name associated with the telephone number that corresponds to the obtained caller number from the data region 71 and displays the name (S23; the function of the second display control unit). FIG. 12C shows the displaying example of the LCD 3 in S23. A display 33 of the name corresponding to the caller number is displayed on the display screen of the LCD 3, together with the display 39 indicating during FAX reception.

In S13, if the caller number could not be obtained through the Caller ID (S13: NO), the controller 10A performs the process for extracting the caller information from the page data on the first page of the received image data, as mentioned above (S14).

Figure 12D:
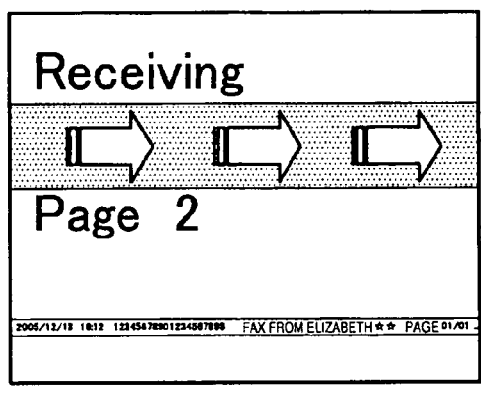

If the picture data of the caller information could be obtained in S14 (S16: YES), the controller 10A adjusts the picture data of the call information to the size capable of being displayed on the display screen of the LCD 3 (S17), and then displays the picture data of the caller information (S24). FIG. 12D shows the displaying example of the LCD 3 in S24. The display 34A of the picture data of the extracted caller information is displayed on the display screen of the LCD 3, together with the display 39 indicating during FAX reception.

Figure 12E:
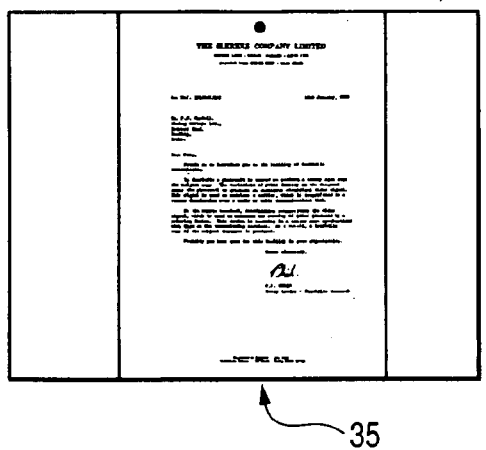

On the other hand, if the picture data of the caller information could not be obtained in S14 (S16: NO), the controller 10A displays the page data on the first page among the received image data (S25). FIG. 12E shows the displaying example of the LCD 3 in S25. A display 35 of the page data on the first page is displayed on the display screen of the LCD 3. This display 35 is displayed after the reception of the page data on the first page. Typically, there is a high possibility that the first page of the FAX data is the front page where the information regarding the caller is noted. Thus, even in the case that the picture data of the caller information could not be obtained, since the display 35 is displayed in this way, the user can see the caller.

As mentioned above, in S21 to S25 and S17, the controller 10A functions as the first display control unit.

Figure 8:
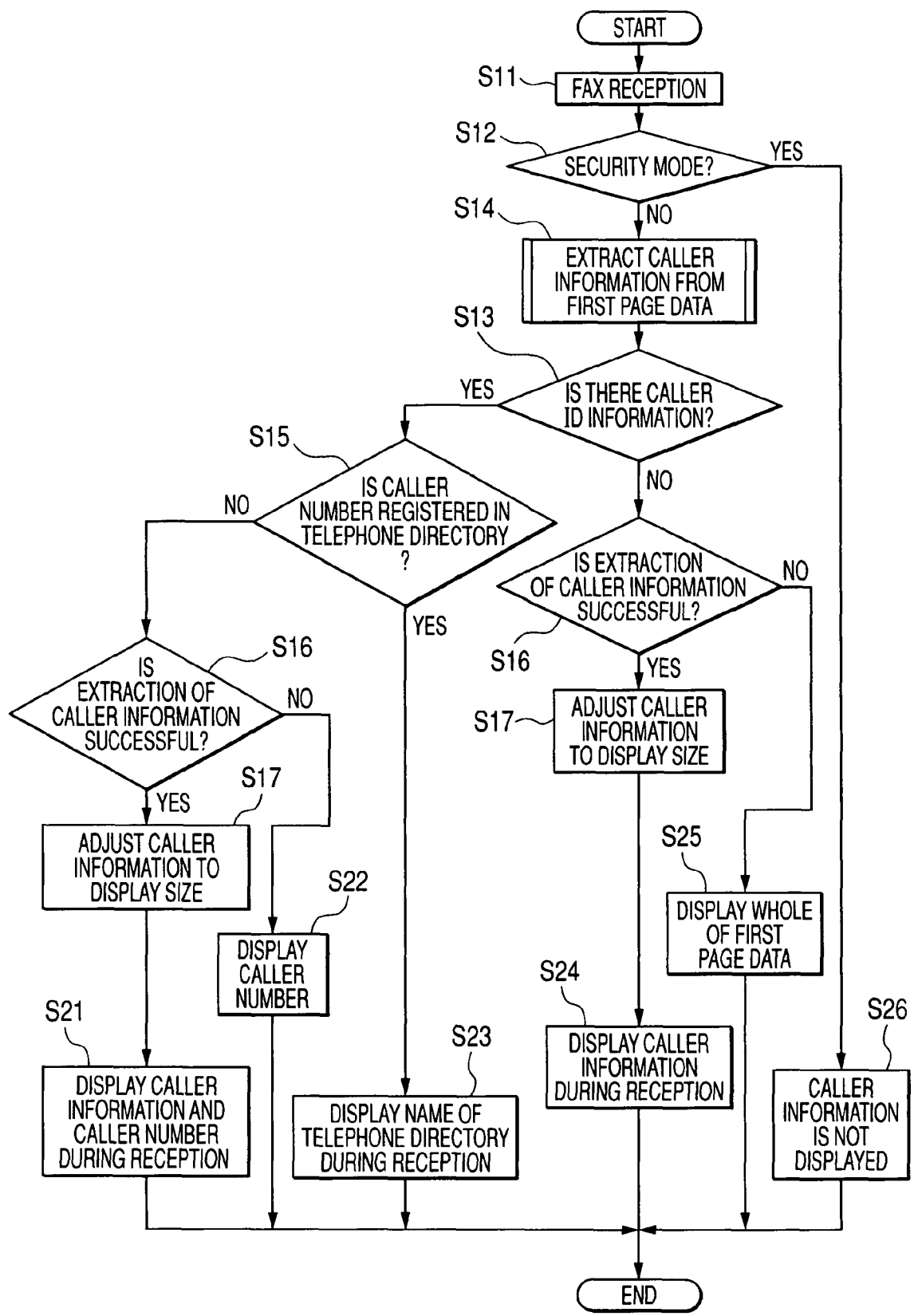
FIG. 8 is a flowchart showing display process during a reception operation of a second example.

FIG. 8 is a flowchart illustrating a second process example in the Display Operation During Reception executed by the controller 10A in the multi function device 1A. It is noted that the same number is given to the same process in FIG. 7. In the second example, extracting the caller information (S14) is executed before judging whether the caller number could be obtained (S13) and retrieving whether the obtained caller number is registered in the telephone directory (data region 71) (S15).

(2) Display Operation After Reception

The controller 10A performs the Display Operation After Reception (Preview Operation) that includes reading and displaying the stored image data of the Fax having been completed to receive, in accordance with the operation by the user.

At the time of the foregoing FAX reception, the controller 10A stores the received image data in the data region 73 of the flash memory 104 and also stores the location address in the preview list (the data region 72). In addition, the controller 10A stores a reception time of the Fax in the preview list (the data region 72; see FIG. 5), together with the caller number if the caller number could be obtained through the Caller ID, and the location address of the caller's name corresponding the obtained caller number if the obtained caller number is registered in the telephone directory (data region 71), and the location address of the caller information if the caller information is extracted from the image data and stored in the data region 74.

Figure 13:
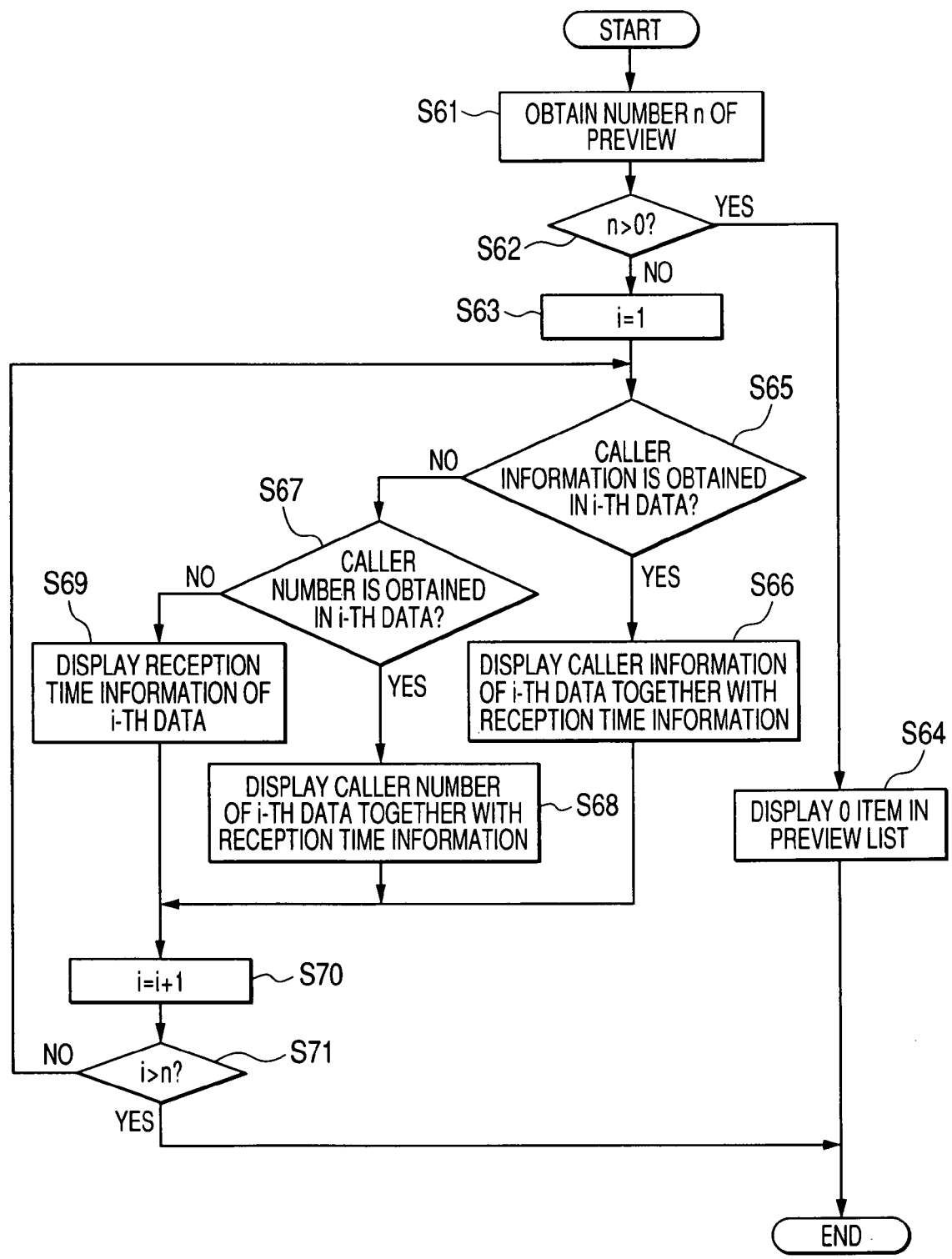
FIG. 13 is a flowchart showing a process for displaying a preview list.

In the Display Operation After Reception (Preview Operation), the controller 10A firstly performs displaying the preview list, in accordance with the storage content of the data region 72 (see FIG. 5). FIG. 13 shows a flowchart illustrating a process to display the preview list. This process starts when the user operates the operation keys 4 to display the preview list.

According to the flowchart of FIG. 13, the controller 10A firstly obtains the number of the received FAXs from the data region 72 (S61). Then, the controller 10A reads the information regarding the caller (caller number and/or caller information) and the reception time for each received FAX from the data region 72, and prepares and displays the preview list (S62 to S71).

Specifically, if there is the call information extracted from the image data and stored in the data region 74 with respect to the received FAXs stored in the data region 72 (S65: YES), the controller 10A reads and displays the caller information together with the reception time (S66; the function of a first output unit). Also, if the caller number could be obtained through the Caller ID or if the telephone directory (data region 71) contains a registered telephone number that corresponds the obtained caller number (S67: YES), the controller 10A displays the caller number and the name associated with the telephone number that corresponds to the caller number, together with the reception time (S68; the function of a second output unit). Also, if the caller information is not extracted and if the caller number is not obtained (S65, S67; NO), only the reception time information is displayed (S69).

Figure 14A:
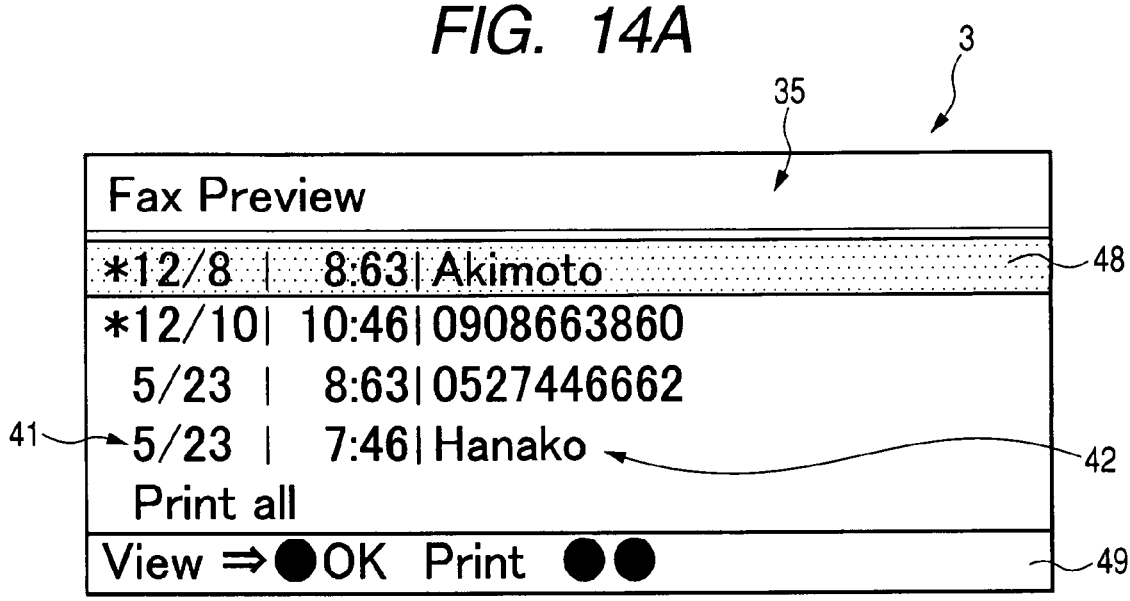
FIG. 14 is a view showing an example of the list displayed on the display screen according to the first embodiment.
Figure 14B:
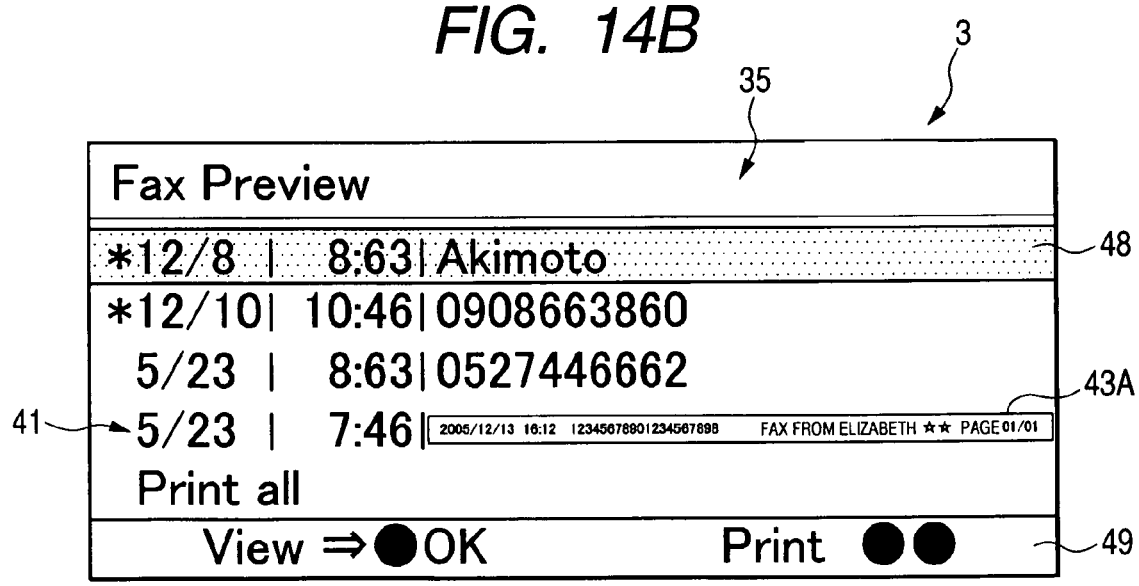

FIGS. 14A and 14B show display examples of the preview list displayed on the display screen. As shown in FIG. 14A, a list 35 is displayed on the display screen of the LCD 3 in S68, which includes a plurality of items for respective received FAXs. Each of the items contains display information 41 representing the reception time and display information 42 of the name read from the telephone directory (data region 71) based on the caller number obtained through the Caller ID. Also, as shown in FIG. 14B, the list 35 is displayed on the display screen of the LCD 3 in S66, which includes a plurality of items for respective FAXs. Each of the items contains the display information 41 representing the reception time and the display information 34A of the caller information read from the data region 74.

Also, the list 35 displayed on the display screen of the LCD 3 is used to read and output the corresponding image data from the data region 73. Specifically, in accordance with the operation through the operation keys 4 by the user, a cursor 48 to specify the item in the list 35 is moved to select the desired item for a preview or print, and then the image data corresponding to the selected item is read from the data region 73. Then, the image data is displayed on the display screen of the LCD 3 adjusted to conform to the size of the allowable display region or printed on the paper by the printer unit 21, in accordance with the input through the operation keys 4 from the user. That is, the display information 34A of the caller information is displayed to call the image data corresponding to the desired FAX from the data region 73. On the display screen of the LCD 3, a guide display information 49 for previewing and printing is also displayed.

In the above-mentioned embodiment, the preview list is output to the display screen of the LCD 3. However, this is not limited thereto, and the preview list may be output to a medium, such as paper and the like, by the printer unit 21.

Second Embodiment

The second embodiment of the present invention will be described. Hereafter, the points different from the first embodiment are mainly explained, and the same numbers are assigned to the overlapping portions, and their explanations are omitted. A multi function device 1B as an example of the communication apparatus of the second embodiment has a configuration similar to the first embodiment.

A controller 10B of the multi function device 1B mainly executes the (1) Display Operation During Reception and (2) Display Operation After Reception (Preview Operation), similarly to the first embodiment.

Figure 15:
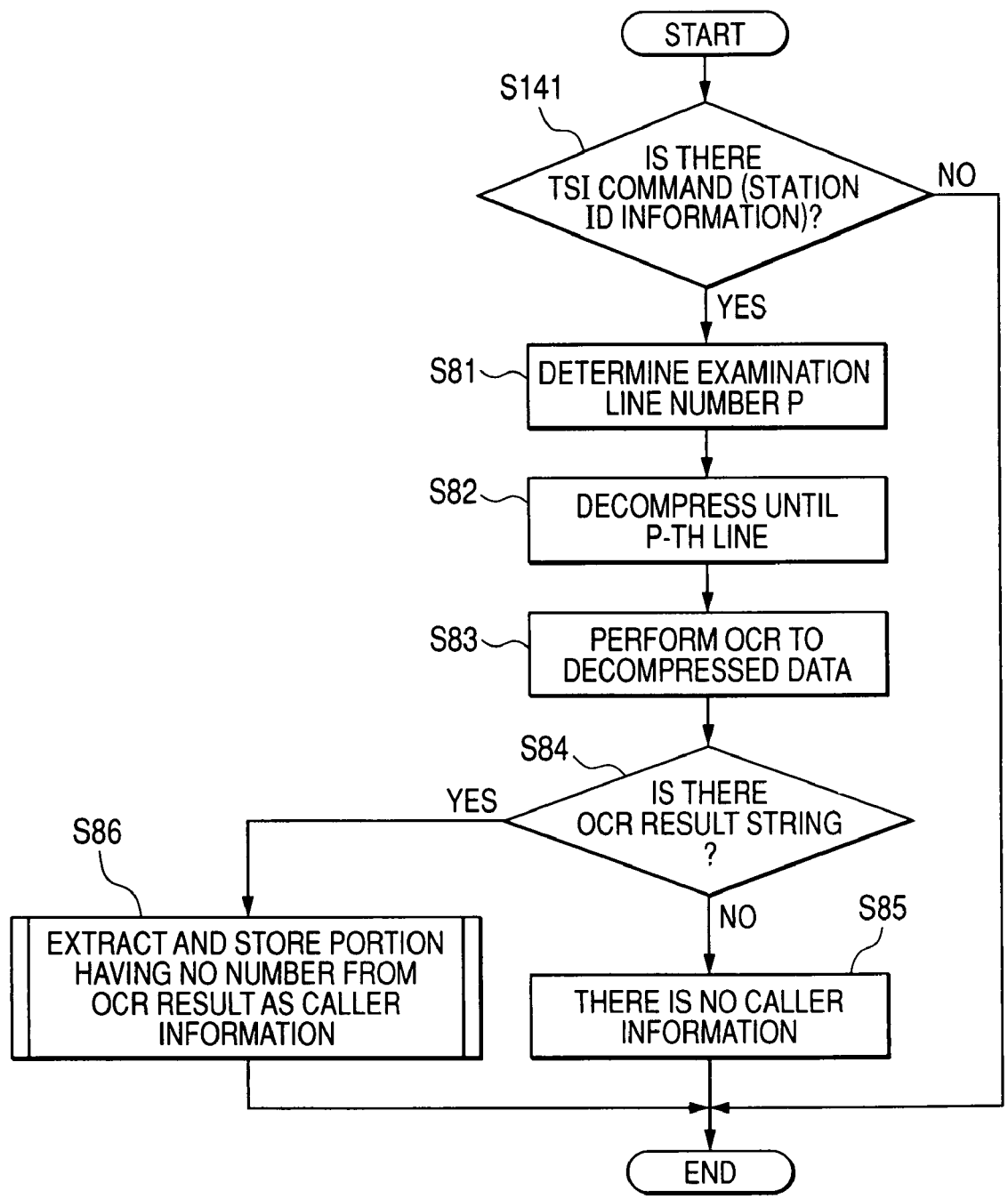
FIG. 15 is a flowchart showing a process for obtaining the caller information according to a second embodiment.

In the (1) Display Operation During Reception, the controller 10B of the multi function device 1B executes identifying characters from the image data and extracting the caller information as character data as shown in a flowchart of FIG. 15, instead of the S14 (refer to FIGS. 7 and 8) to extract the caller information from the image data.

Specifically, if the TSI command includes the station ID (S141: YES), the region of the predetermined length (an examination line number P) in the read direction from the head of the page data on the first page is set as a character identification region (S81, S82; the function of the cutting unit). Then, the character is identified from the region and converted into the character data (S83; the function of the character reading unit). As a method for identifying the character from the image data and converting it into the character data, a known OCR (Optical Character Recognition) method can be used.

If it could be converted into the character data (S84: YES), the controller 10A performs the process to extract a string from the character data as the caller information. The string as the caller information includes a character that is neither a numeral nor a symbol. The controller 10A stores the caller information in the region 74 of the flash memory 104 (S86; the function of a character extracting unit).

Figure 16:
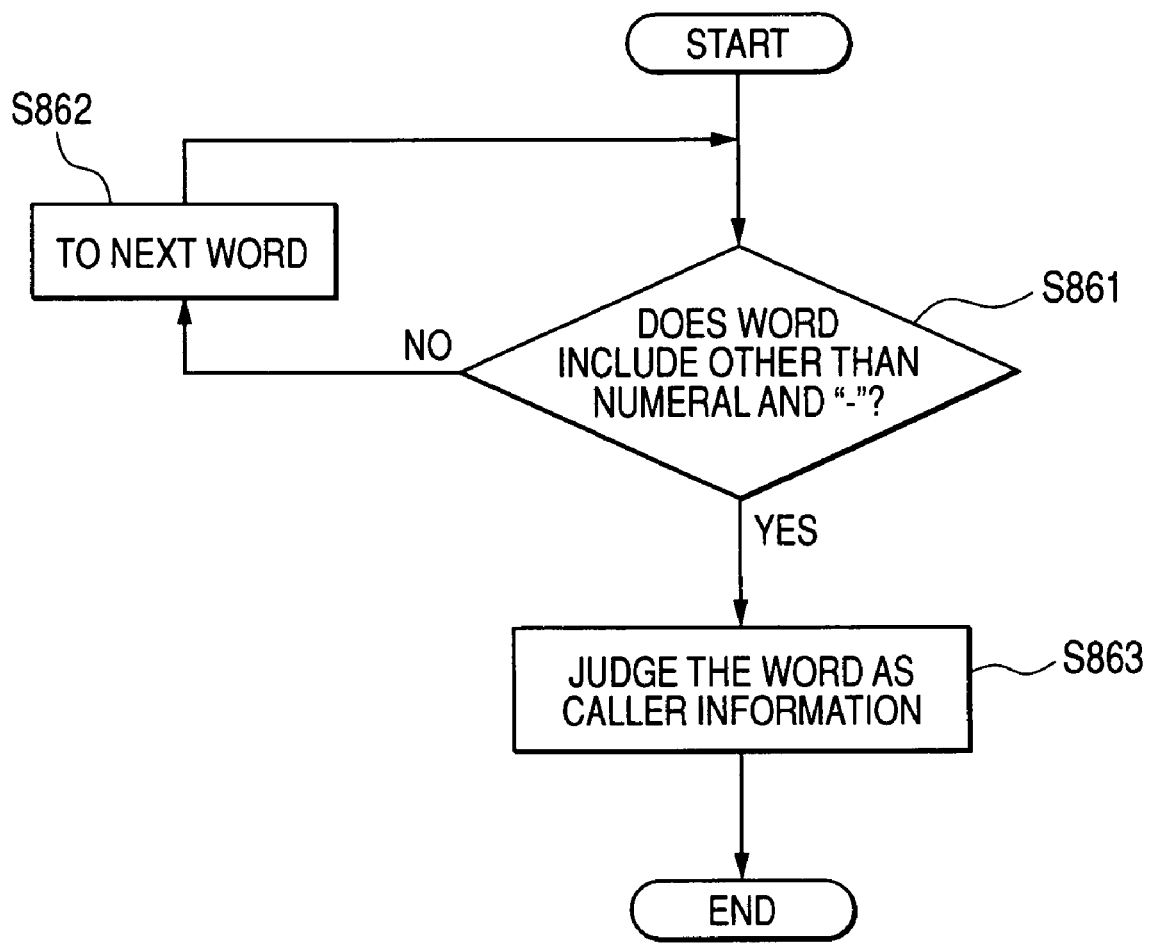
FIG. 16 is a flowchart showing a process for extracting the caller information according to the second embodiment.

An example of the process of the S86 is shown in a flowchart of FIG. 16. In S86, the controller 10A judges whether a word included in the converted character data includes the character except a numeral and a symbol (for example, a "–" symbol) (S861). Here, the word implies a mass of the characters delimited by a blank portion (for example, continuous blank characters) in the converted character data. If the character except a numeral and a symbol is included (S861: YES), the controller 10A judges the word as the caller information (S863).

There is a case that the predetermined region cut from the image data includes the string, which includes of numerals and symbols, such as dates and times, identification numbers, page numbers and the like, other than the string to specify the caller. However, in order to remove them, since the string including the character that is neither a numeral nor a symbol is extracted as the caller information from the character data (S863), the caller information can be obtained from the string to specify the caller.

Figure 17:
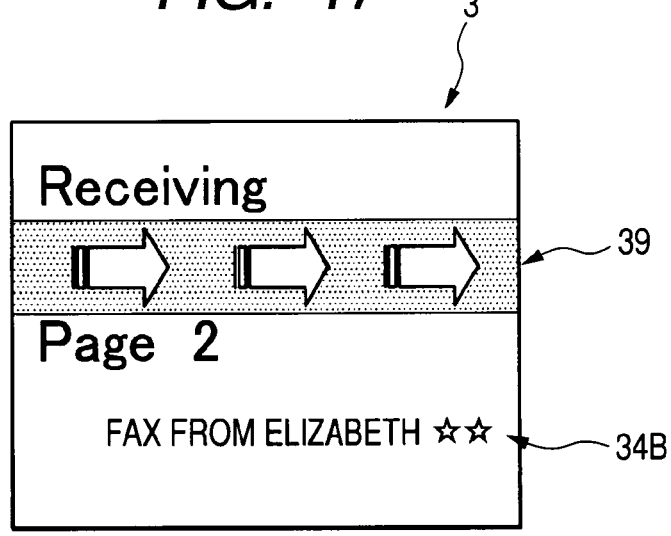
FIG. 17 is a view showing an example of information displayed on the display screen during the reception operation according to the second embodiment.

The controller 10A displays the caller information extracted as the character data as mentioned above, during FAX reception in S24 (see FIGS. 7 and 8). FIG. 17 shows the display example on the display screen at S24. The display information 34B of the character data of the extracted caller information is displayed on the display screen of the LCD 3, together with the display information 39 indicating during FAX reception.

The controller 10A stores the caller information extracted as the character data into the data region 74 of the flash memory 104. Then, at the process to display the preview list of (2) Display Operation After Reception (Preview Operation) (see FIG. 13), the controller 10A reads the caller information extracted as the character data from the data region 74, and displays the caller information included in the preview list.

Figure 18:
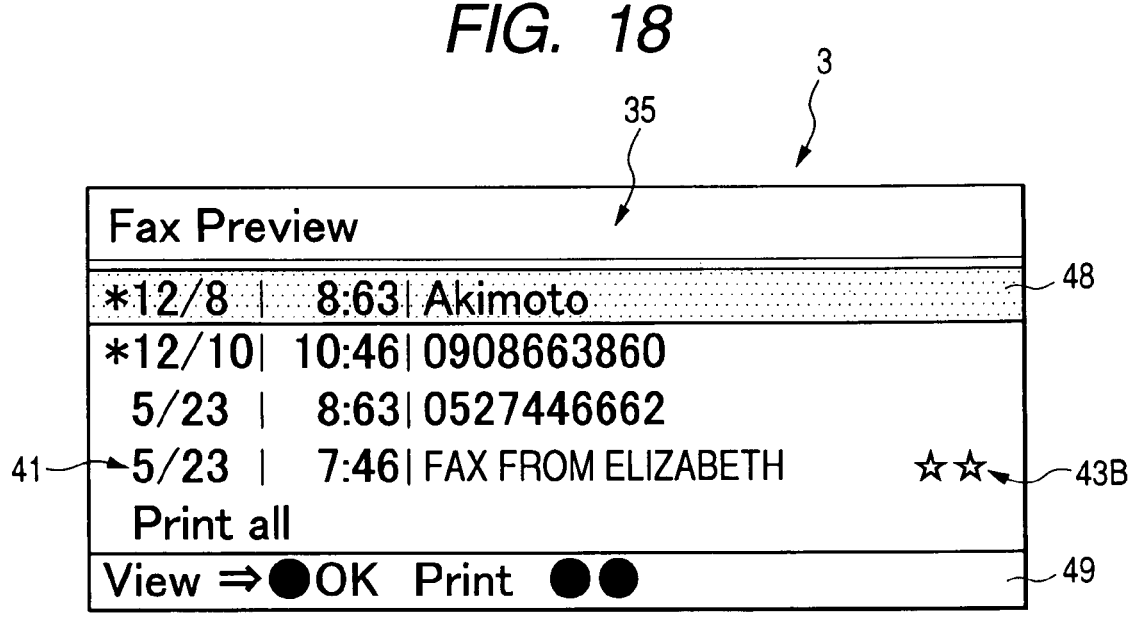
FIG. 18 is a view showing an example of the list displayed on the display screen according to the second embodiment.

FIG. 18 shows a display example of the preview list displayed on the display screen. The preview list 35 is displayed on the display screen of the LCD 3 at S66, which includes a plurality of items for respective received FAXs. Each of the items contains the display information 41 indicating the reception time and a display information 34B of the character data of the caller information read from the data region 74.

Third Embodiment

The third embodiment of the present invention will be described. Hereafter, the points different from the first embodiment and the second embodiment are mainly explained, and the same numbers are assigned to the overlapping portions, and their explanations are omitted. A multi function device 1C as an example of the communication apparatus of the third embodiment has a configuration similar to the first embodiment and the second embodiment.

A controller 10C of the multi function device 1C mainly executes (1) Display Operation During Reception and (2) Display Operation After Reception (Preview Operation), similarly to the first embodiment and the second embodiment.

Figure 19:
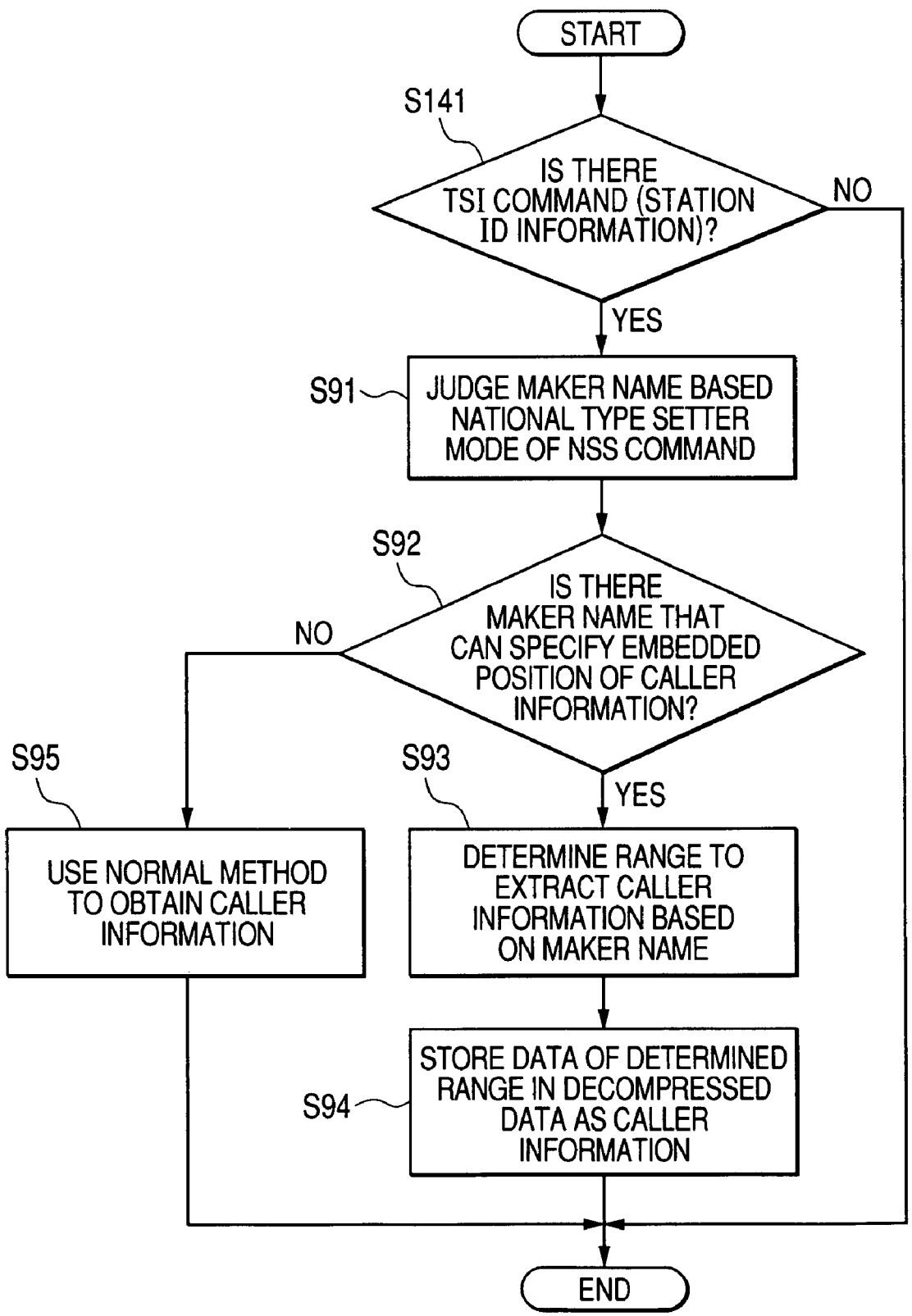
FIG. 19 is a flowchart showing a process for obtaining the caller information according to a third embodiment.

In the (1) Displaying Operation During Reception, as shown in a flowchart of FIG. 19, the controller 1C of the multi function device 1C executes, if position specification information (a manufacturing maker name in this embodiment) that can specify a position where the caller information is embedded in the image data is included in a signal received transmitted from the caller, a process to extract the caller information from the position specified thereby, instead of the S14 for extracting the caller information from the image data (see FIGS. 7 and 8).

Here, the position specification information may include information to indicate the position where the caller information is embedded, depending on the manufacturing maker of the apparatus and the model and the like. In the communication apparatus, when the manufacturing maker of the apparatus and the model and the like are obtained from the signal received together with the image data from the caller, the position where the caller information is embedded is specified from the information.

Specifically, if the TSI command includes the station ID (S141: YES), the controller 10A obtains the manufacturing maker name of an apparatus of a calling party in accordance with a national type setter mode included in an NSS (Non-Standard facilities Set-up) command, and judges whether the position where the caller information is embedded in the image data can be specified from the obtained manufacturing maker name (S91, S92; the function of a judging unit).

As shown in FIG. 6, in the facsimile data (image data), a header part 82 of a page includes a part 85 representing the station ID information of the caller. However, the position where the part 85 representing this station ID information is formed does not have any special rule. Thus, depending on the manufacturing maker of the apparatus, the position is different in many cases. However, in other words, if the manufacturing maker name of the apparatus of the calling party is known, the position where the part 85 representing the station ID information is formed in the image data can be specified. Thus, the controller 10A obtains the manufacturing maker name of the apparatus of the calling party (S91) and consequently judges whether the position where the caller information (namely, the part 85 representing the station ID information) is embedded in accordance with the manufacturing maker name (S92). The ROM 102 stores the information of the position where the part 85 representing the station ID information is formed in the image data, for each manufacturing maker.

If the position where the caller information is embedded in the image data can be specified from the obtained manufacturing maker name (S92: YES), the controller 10A cuts the specified region from the image data and stores the cut picture data as the caller information (S93, S94; the function of the cutting unit).

Figure 20:
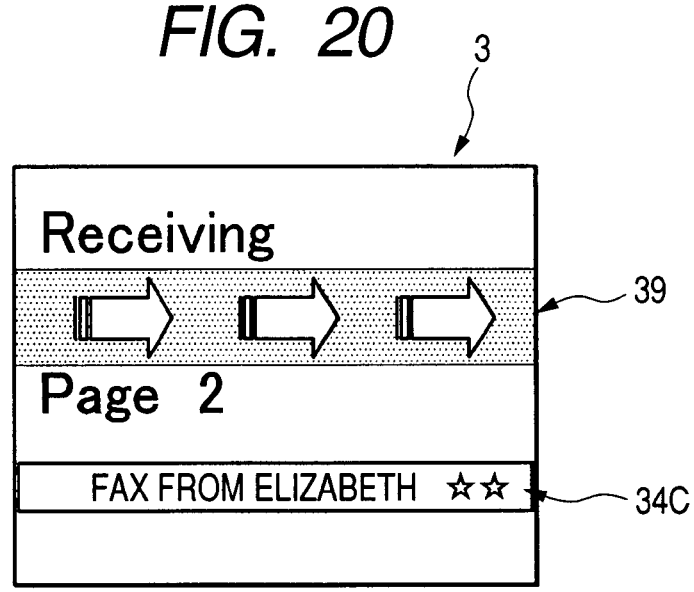
FIG. 20 is a view showing an example of information displayed on the display screen during the reception operation according to the third embodiment.

The controller 10A displays the caller information extracted as the picture data as mentioned above, during FAX reception in S24 (refer to FIGS. 7 and 8). FIG. 20 shows a display example. A display 34C of the picture data of the extracted caller information is displayed on the display screen of the LCD 3, together with the display information 39 representing during FAX reception.

Also, the controller 10A stores the caller information extracted as the picture data, in the data region 74 of the flash memory 104. In the process (refer to FIG. 13) for displaying the preview list of (2) Display Operation After Reception (Preview Operation), the controller 10A reads the caller information extracted as the picture data and displays it after the inclusion in the preview list.

Figure 21:
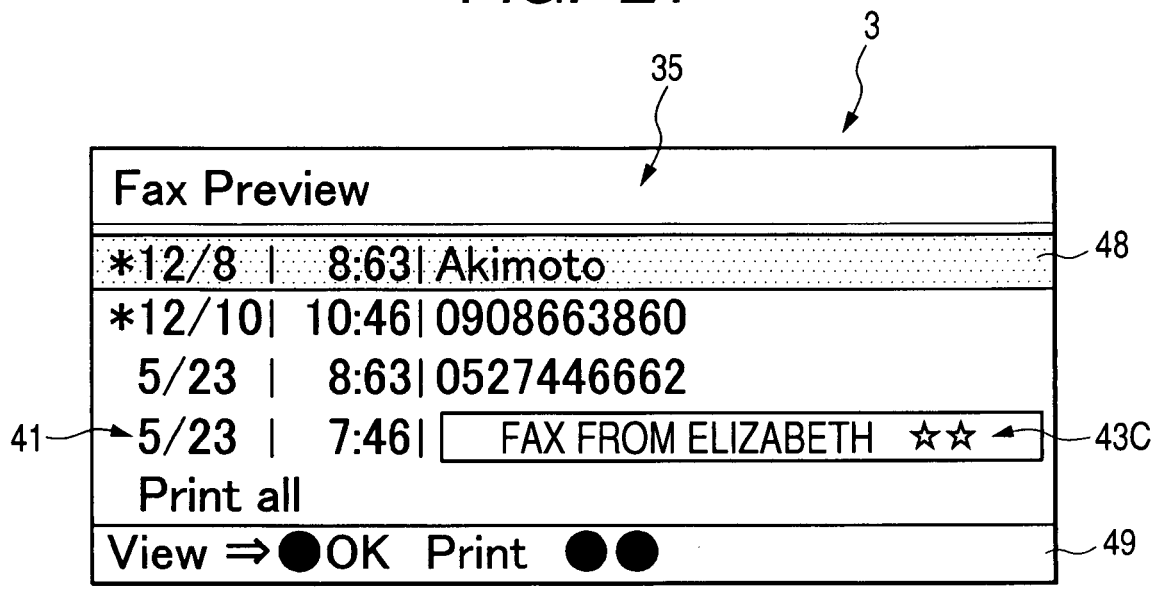
FIG. 21 is a view showing an example of a list displayed on the display screen according to the third embodiment.

FIG. 21 shows the example of the displayed list. In S66 (see FIG. 13), the list 35 includes an item including the display information 41 representing the reception time and the display information 43C of the picture data of the caller information read from the data region 74, and is displayed on the display screen of the LCD 3.

According to the above embodiments of the invention, a communication apparatus where a user is easily able to know the caller can be provided.

As mentioned above, the present invention is not limited to the specific embodiments described above. The present invention may be suitably modified and executed within the range of the scope and spirit similar to the invention embodied in them. For example, as the communication apparatus, the multi function device having the scanner function, the printer function and the facsimile function and the like has been exemplified in the embodiments. However, the facsimile apparatus having only the facsimile function, or any other communication device may be applied to the communication apparatus.

What is claimed is:

1. A communication apparatus comprising:
    an obtaining unit configured to obtain a caller identification information through a caller identification via a communication line when an incoming call is received from a caller;
    an image data receiving unit configured to receive an image data transmitted from the caller via the communication line;
    an extracting unit configured to extract caller information from the image data to specify the caller; and
    a first display control unit configured to display the caller information on a display screen when the obtaining unit does not obtain the caller identification information at the incoming call,
    wherein the caller information is embedded in a head region of each page data contained in the image data,
    wherein the extracting unit includes: a judging unit configured to read data from a head of the page data and judge whether a non-blank portion exists from the head to a first predetermined length in a read direction; and a cutting unit configured to, if the non-blank portion exists, cut a region of a second predetermined length in the read direction from a position of the non-blank portion, and
    wherein picture data related to the region of the predetermined length that is cut from the page data by the cutting unit is defined as the caller information.

2. The communication apparatus according to claim 1, wherein the extracting unit extracts the caller information from the image data, if the obtaining unit does not obtain the caller identification information at the incoming call.

3. The communication apparatus according to claim 1, further comprising:
    a storage unit capable of storing registered caller identification information for at least one caller and correspondence information that is correlated to the registered caller identification information for each registered caller; and
    a second display control unit configured to, if the obtaining unit obtains the caller identification information at the incoming call and the registered caller identification information contains the caller identification information obtained by the obtaining unit, display the correspondence information associated with the registered caller identification information that corresponds to the caller identification information obtained by the obtaining unit,
    wherein the first information display control unit displays the caller information, even if the correspondence information corresponding to the caller identification information obtained by the obtaining unit is not stored in the storage unit.

4. The communication apparatus according to claim 3, wherein the extracting unit extracts the caller information from the image data, if the obtaining unit obtains the caller identification information and the correspondence information corresponding the caller identification information obtained by the obtaining unit is not stored in the storage unit.

5. The communication apparatus according to claim 3, wherein the first display control unit displays the caller identification information together with the caller information, on the display screen.

6. The communication apparatus according to claim 1, wherein:
    the extracting unit extracts the caller information from the image data during a reception of the image data, and
    the first display control unit displays the caller information during the reception of the image data and after extracting the caller information.

7. The communication apparatus according to claim 1, wherein:
    the caller information is embedded in a head region of each page data contained in the image data;
    the extracting unit extracts the caller information from the head region, during a reception of the page data on a first page among the image data; and the first display control unit displays the caller information after extracting the caller information and before completing the reception of the page data on the first page.

8. The communication apparatus according to claim 1, wherein the first display control unit adjusts and displays the caller information within a size of a region to be displayed on the display screen.

9. The communication apparatus according to claim 1, wherein the first display control unit displays the page data on the first page in the image data on the display screen, if the extracting unit fails to extract the caller information.

10. The communication apparatus according to claim 1, further comprising a display limiting unit configured to switch whether or not the first display control unit is allowed to display the caller information.

11. The communication apparatus according to claim 1, wherein the extracting unit extracts the caller information from the image data, if a signal received together with the image data from the caller includes the caller information to specify the caller.

12. The communication apparatus according to claim 1, wherein the extracting unit comprises a character reading unit configured to identify a character from the image data and convert the character in the image data into character data, and the extracting unit extracts the caller information as the character data converted by the character reading unit.

13. A communication apparatus comprising:
an obtaining unit configured to obtain a caller identification information through a caller identification via a communication line when an incoming call is received from a caller;
an image data receiving unit configured to receive an image data transmitted from the caller via the communication line;
an extracting unit configured to extract caller information from the image data to specify the caller; and
a first display control unit configured to display the caller information on a display screen when the obtaining unit does not obtain the caller identification information at the incoming call,
wherein the extracting unit comprises a character reading unit configured to identify a character from the image data and convert the character in the image data into character data, and the extracting unit extracts the caller information as the character data converted by the character reading unit, and
wherein:
the extracting unit includes the cutting unit configured to cut a predetermined region from the image data, and
the character reading unit identifies the character from the predetermined region cut by the cutting unit and converts the character in the predetermined region into the character data, and comprises a character extracting unit configured to extracting a string as the caller information, the string includes a character that is neither a numeral nor a symbol, from the character data converted by the character reading unit.

14. The communication apparatus according to claim 1, wherein the extracting unit includes:
a judging unit configured to judge whether a signal received together with the image data from the caller includes a position specification information that can specify a position where the caller information is embedded in the image data; and
a cutting unit configured to cut the caller information from the position that is specified in accordance with the position specification information in the image data, if the position specification information is included in the signal received together with the image data from the caller.

15. A communication apparatus comprising:
an obtaining unit configured to obtain a caller identification information through a caller identification via a communication line when an incoming call is received from a caller;
an image data receiving unit configured to receive an image data transmitted from the caller via the communication line;
an extracting unit configured to extract caller information from the image data to specify the caller;
a first storage unit that stores the caller information and the image data that is correlated to the caller information;
an input unit that accepts an input signal to refer to a storage content of the first storage unit; and
a first output unit configured to output the caller information stored in the first storage unit in response to the input from the input unit, if the caller identification information is not obtained by the obtaining unit,
wherein the caller information is embedded in a head region of each page data contained in the image data,
wherein the extracting unit includes: a judging unit configured to read data from a head of the page data and judge whether a non-blank portion exists from the head to a first predetermined length in a read direction; and a cutting unit configured to, if the non-blank portion exists, cut a region of a second predetermined length in the read direction from a position of the non-blank portion, and
wherein picture data related to the region of the predetermined length that is cut from the page data by the cutting unit is defined as the caller information.

16. The communication apparatus according to claim 15, wherein the extracting unit extracts the caller information from the image data, if the caller identification information is not obtained at the incoming call.

17. The communication apparatus according to claim 15, including:
a second storage unit that stores registered caller identification information for at least one caller and correspondence information that is correlated to the registered caller identification information for each registered caller; and
a second output unit configured to, if the obtaining unit obtains the caller identification information at the incoming call and the registered caller identification information contains the caller identification information obtained by the obtaining unit, display the correspondence information associated with the registered caller identification information that corresponds to the caller identification information obtained by the obtaining unit,
wherein the first output unit outputs the caller information, even if the correspondence information corresponding to the caller identification information obtained by the obtaining unit is not stored in the second storage unit.

18. The communication apparatus according to claim 17, wherein the extracting unit extracts the caller information from the image data, if the obtaining unit obtains the caller identification information and the correspondence information corresponding to the caller identification information obtained by the obtaining unit is not stored in the second storage unit.

19. The communication apparatus according to claim 15, wherein:

the first storage unit stores a reception time of the image data to be correlated to the caller information; and the first output unit outputs the reception time together with the caller information.

20. The communication apparatus according to claim 15, wherein the first output unit outputs to a list of an array of information regarding the image data, the list includes the caller information stored in the first storage unit.

21. The communication apparatus according to claim 15, wherein the first output unit performs a display operation on a display screen to display the caller information to allow a user to call the corresponding image data.

22. The communication apparatus according to claim 15, wherein the first output unit performs the display operation on the display screen to adjust and display the caller information within a size of a region to be displayed on the display screen.

23. The communication apparatus according to claim 15, wherein the extracting unit extracts the caller information from the image data, if a signal received together with the image data from the caller includes the caller information to specify the caller.

24. The communication apparatus according to claim 15, wherein the extracting unit comprises a character reading unit configured to identify a character from the image data and convert the character in the image data into character data, and the extracting unit extracts the caller information as the character data converted by the character reading unit.

25. A communication apparatus comprising:
an obtaining unit configured to obtain a caller identification information through a caller identification via a communication line when an incoming call is received from a caller;
an image data receiving unit configured to receive an image data transmitted from the caller via the communication line;
an extracting unit configured to extract caller information from the image data to specify the caller;
a first storage unit that stores the caller information and the image data that is correlated to the caller information;
an input unit that accepts an input signal to refer to a storage content of the first storage unit; and
a first output unit configured to output the caller information stored in the first storage unit in response to the input from the input unit, if the caller identification information is not obtained by the obtaining unit,
wherein the extracting unit comprises a character reading unit configured to identify a character from the image data and convert the character in the image data into character data, and the extracting unit extracts the caller information as the character data converted by the character reading unit, and wherein:
the extracting unit includes the cutting unit configured to cut a predetermined region from the image data, and
the character reading unit identifies the character from the predetermined region cut by the cutting unit and converts the character in the predetermined region into the character data, and comprises a character extracting unit configured to extracting a string as the caller information, the string includes a character that is neither a numeral nor a symbol, from the character data converted by the character reading unit.

26. A communication apparatus comprising:
an obtaining unit configured to obtain a caller identification information through a caller identification via a communication line when an incoming call is received from a caller;
an image data receiving unit configured to receive an image data transmitted from the caller via the communication line;
an extracting unit configured to extract caller information from the image data to specify the caller;
a first storage unit that stores the caller information and the image data that is correlated to the caller information;
an input unit that accepts an input signal to refer to a storage content of the first storage unit; and
a first output unit configured to output the caller information stored in the first storage unit in response to the input from the input unit, if the caller identification information is not obtained by the obtaining unit,
wherein the extracting unit includes:
a judging unit configured to judge whether a signal received together with the image data from the caller includes a position specification information that can specify a position where the caller information is embedded in the image data; and
a cutting unit configured to cut the caller information from the position that is specified in accordance with the position specification information in the image data, if the position specification information is included in the signal received together with the image data from the caller.

* * * * *